(12) United States Patent
Anderson

(10) Patent No.: US 9,274,524 B2
(45) Date of Patent: Mar. 1, 2016

(54) METHOD FOR MACHINE COORDINATION WHICH MAINTAINS LINE-OF-SITE CONTACT

(71) Applicant: Deere & Company, Moline, IL (US)

(72) Inventor: Noel Wayne Anderson, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/631,210

(22) Filed: Feb. 25, 2015

(65) Prior Publication Data

US 2015/0177736 A1    Jun. 25, 2015

Related U.S. Application Data

(62) Division of application No. 12/903,883, filed on Oct. 13, 2010, now Pat. No. 9,026,315.

(51) Int. Cl.
| | |
|---|---|
| *G06F 7/70* | (2006.01) |
| *G06F 19/00* | (2011.01) |
| *G06G 7/00* | (2006.01) |
| *G06G 7/76* | (2006.01) |

(Continued)

(52) U.S. Cl.
CPC .............. *G05D 1/0242* (2013.01); *G05D 1/028* (2013.01); *G05D 1/0231* (2013.01); *G05D 1/0274* (2013.01); *G05D 1/0291* (2013.01); *G05D 1/0297* (2013.01); *B60W 2300/158* (2013.01); *G05D 1/024* (2013.01); *G05D 1/0246* (2013.01); *G05D 1/0257* (2013.01); *G05D 1/0278* (2013.01); *G05D 2201/0201* (2013.01)

(58) Field of Classification Search
USPC ....................................................... 701/23, 50
See application file for complete search history.

(56) References Cited

U.S. PATENT DOCUMENTS

| | | |
|---|---|---|
| 4,166,349 A | 9/1979 | Coenenberg et al. |
| 5,334,986 A | 8/1994 | Fernhout |

(Continued)

FOREIGN PATENT DOCUMENTS

| | | |
|---|---|---|
| CA | 2305606 A1 | 10/2000 |
| DE | 102006017540 A1 | 10/2007 |

(Continued)

OTHER PUBLICATIONS

Gao, "Optimal Adaptive Routing and Traffic Assignment in Stochastic Time-Dependent Networks," Thesis, Doctor of Philosophy in Transportation, Massachusetts Institute of Technology, Feb. 2005, 237 pages.

(Continued)

*Primary Examiner* — Imran Mustafa
(74) *Attorney, Agent, or Firm* — Yee & Associates, P.C.

(57) ABSTRACT

A method and system that facilitates operation of autonomous equipment by providing a mission planner to maintain line-of-sight contact between a plurality of coordinated machines, including a method for maintaining line-of-sight (LoS) communication between a plurality of machines that creates a mission plan for a work site that includes a path plan for each of the plurality of machines that maintains the line-of-sight communication between the plurality of machines by taking into account a topography for the work site; and loads the path plan for each respective one of the plurality of machines into each respective one of the plurality of machines, wherein the path plan specifies a machine travel path for each respective one of the plurality of machines.

18 Claims, 9 Drawing Sheets

(51) Int. Cl.
*G01C 22/00* (2006.01)
*G05D 1/00* (2006.01)
*G05D 1/02* (2006.01)

(56) References Cited

U.S. PATENT DOCUMENTS

| | | |
|---|---|---|
| 5,416,310 A | 5/1995 | Little |
| 5,572,401 A | 11/1996 | Carroll |
| 5,615,116 A | 3/1997 | Gudat et al. |
| 5,632,044 A | 5/1997 | Sloot |
| 5,684,476 A | 11/1997 | Anderson |
| 5,684,696 A | 11/1997 | Rao et al. |
| 5,734,932 A | 3/1998 | Washisu |
| 5,892,445 A | 4/1999 | Tomich |
| 5,911,669 A | 6/1999 | Stentz et al. |
| 6,032,097 A | 2/2000 | Iihoshi et al. |
| 6,038,502 A | 3/2000 | Sudo |
| 6,101,795 A | 8/2000 | Diekhans |
| 6,108,197 A | 8/2000 | Janik |
| 6,128,559 A | 10/2000 | Saitou et al. |
| 6,163,277 A | 12/2000 | Gehlot |
| 6,191,813 B1 | 2/2001 | Fujisaki et al. |
| 6,246,932 B1 | 6/2001 | Kageyama et al. |
| 6,275,283 B1 | 8/2001 | Hasson |
| 6,313,454 B1 | 11/2001 | Bos et al. |
| 6,324,586 B1 | 11/2001 | Johnson |
| 6,356,820 B1 | 3/2002 | Hashimoto et al. |
| 6,434,622 B1 | 8/2002 | Monteiro et al. |
| 6,457,024 B1 | 9/2002 | Felsentein et al. |
| 6,507,486 B2 | 1/2003 | Peterson, III |
| 6,529,372 B1 | 3/2003 | Ng et al. |
| 6,552,661 B1 | 4/2003 | Lastinger et al. |
| 6,581,571 B2 | 6/2003 | Kubesh et al. |
| 6,584,390 B2 | 6/2003 | Beck |
| 6,615,570 B2 | 9/2003 | Beck et al. |
| 6,650,242 B2 | 11/2003 | Clerk et al. |
| 6,678,580 B2 | 1/2004 | Benneweis |
| 6,694,260 B1 | 2/2004 | Rekow |
| 6,708,080 B2 | 3/2004 | Benneweis |
| 6,728,608 B2 | 4/2004 | Ollis et al. |
| 6,732,024 B2 | 5/2004 | Rekow et al. |
| 6,760,654 B2 | 7/2004 | Beck |
| 6,839,127 B1 | 1/2005 | Anderson |
| 6,859,729 B2 | 2/2005 | Breakfield et al. |
| 6,882,897 B1 | 4/2005 | Fernandez |
| 6,898,501 B2 | 5/2005 | Schubert |
| 6,917,300 B2 | 7/2005 | Allen |
| 6,943,824 B2 | 9/2005 | Alexia et al. |
| 7,064,810 B2 | 6/2006 | Anderson et al. |
| 7,088,252 B2 | 8/2006 | Weekes |
| 7,164,118 B2 | 1/2007 | Anderson et al. |
| 7,167,797 B2 | 1/2007 | Faivre et al. |
| 7,222,004 B2 | 5/2007 | Anderson |
| 7,265,970 B2 | 9/2007 | Jordan |
| 7,266,477 B2 | 9/2007 | Foessel |
| 7,286,934 B2 | 10/2007 | Gaegauf et al. |
| 7,299,056 B2 | 11/2007 | Anderson |
| 7,299,057 B2 | 11/2007 | Anderson |
| 7,313,404 B2 | 12/2007 | Anderson |
| 7,317,977 B2 | 1/2008 | Matrosov |
| 7,317,988 B2 | 1/2008 | Johnson |
| 7,330,117 B2 | 2/2008 | Ferguson et al. |
| 7,375,627 B2 | 5/2008 | Johnson et al. |
| 7,382,274 B1 | 6/2008 | Kermani et al. |
| 7,400,976 B2 | 7/2008 | Young et al. |
| 7,474,945 B2 | 1/2009 | Matsunaga |
| 7,499,776 B2 | 3/2009 | Allard et al. |
| 7,545,286 B2 | 6/2009 | Yanase |
| 7,561,948 B2 | 7/2009 | Gaegauf et al. |
| 7,579,939 B2 | 8/2009 | Schofield et al. |
| 7,610,125 B2 | 10/2009 | Fitzner et al. |
| 7,623,951 B2 | 11/2009 | Congdon et al. |
| 7,668,621 B2 | 2/2010 | Bruemmer |
| 7,693,624 B2 | 4/2010 | Duggan et al. |
| 7,719,410 B2 | 5/2010 | Labuhn et al. |
| 7,725,261 B2 | 5/2010 | Sekiguchi |
| 7,734,419 B2 | 6/2010 | Kondoh |
| 7,742,864 B2 | 6/2010 | Sekiguchi |
| 7,751,945 B2 | 7/2010 | Obata |
| 7,818,090 B2 | 10/2010 | Okamoto |
| 7,852,233 B2 | 12/2010 | Cemper |
| 7,894,982 B2 | 2/2011 | Reeser et al. |
| 7,899,584 B2 | 3/2011 | Schricker |
| 7,916,898 B2 | 3/2011 | Anderson |
| 7,930,056 B2 | 4/2011 | Fernandez |
| 8,020,657 B2 | 9/2011 | Allard et al. |
| 8,031,085 B1 | 10/2011 | Anderson |
| 8,072,309 B2 | 12/2011 | Kraimer et al. |
| 8,108,098 B2 | 1/2012 | Childress et al. |
| 8,131,432 B2 | 3/2012 | Senneff et al. |
| 8,139,108 B2 | 3/2012 | Stratton et al. |
| 8,140,658 B1 | 3/2012 | Gelvin et al. |
| 8,175,785 B2 | 5/2012 | Turski et al. |
| 8,190,331 B2 | 5/2012 | Browne et al. |
| 8,195,342 B2 | 6/2012 | Anderson |
| 8,195,358 B2 | 6/2012 | Anderson |
| 8,200,428 B2 | 6/2012 | Anderson |
| 8,205,849 B2 | 6/2012 | Shimizu |
| 8,224,500 B2 | 7/2012 | Anderson |
| 8,229,618 B2 | 7/2012 | Tolstedt et al. |
| 8,253,586 B1 | 8/2012 | Matak |
| 8,255,144 B2 | 8/2012 | Breed et al. |
| 8,392,065 B2 | 3/2013 | Tolstedt et al. |
| 8,467,928 B2 | 6/2013 | Anderson |
| 8,467,943 B2 | 6/2013 | Dersjo et al. |
| 8,560,145 B2 | 10/2013 | Anderson |
| 8,666,587 B2 | 3/2014 | Anderson |
| 8,818,567 B2 | 8/2014 | Anderson |
| 8,989,972 B2 | 3/2015 | Anderson |
| 9,026,315 B2 | 5/2015 | Anderson |
| 2001/0045978 A1 | 11/2001 | McConnell et al. |
| 2002/0059320 A1 | 5/2002 | Tamaru |
| 2002/0156556 A1 | 10/2002 | Ruffner |
| 2003/0186712 A1* | 10/2003 | Tillotson ............ H04B 7/18506 455/501 |
| 2004/0078137 A1 | 4/2004 | Breakfield et al. |
| 2005/0088643 A1 | 4/2005 | Anderson |
| 2005/0275542 A1 | 12/2005 | Weekes |
| 2006/0106496 A1 | 5/2006 | Okamoto |
| 2006/0173593 A1 | 8/2006 | Anderson |
| 2006/0180647 A1 | 8/2006 | Hansen |
| 2006/0189324 A1 | 8/2006 | Anderson |
| 2006/0221328 A1 | 10/2006 | Rouly |
| 2007/0129869 A1 | 6/2007 | Gudat et al. |
| 2007/0168090 A1* | 7/2007 | DeMarco ............... G05D 1/104 701/23 |
| 2007/0171037 A1 | 7/2007 | Schofield et al. |
| 2007/0193798 A1 | 8/2007 | Allard et al. |
| 2007/0198144 A1 | 8/2007 | Norris et al. |
| 2008/0009970 A1 | 1/2008 | Bruemmer |
| 2008/0129445 A1 | 6/2008 | Kraimer et al. |
| 2008/0167781 A1 | 7/2008 | Labuhn et al. |
| 2009/0018712 A1 | 1/2009 | Duncan et al. |
| 2009/0079839 A1 | 3/2009 | Fischer et al. |
| 2009/0216406 A1 | 8/2009 | Senneff et al. |
| 2009/0221328 A1 | 9/2009 | Schumacher et al. |
| 2009/0259399 A1 | 10/2009 | Kotejoshyer et al. |
| 2009/0266946 A1 | 10/2009 | Shimizu |
| 2009/0268946 A1 | 10/2009 | Zhang et al. |
| 2009/0299581 A1 | 12/2009 | Price |
| 2010/0036546 A1 | 2/2010 | Gomes et al. |
| 2010/0042297 A1 | 2/2010 | Foster et al. |
| 2010/0063626 A1 | 3/2010 | Anderson |
| 2010/0063648 A1 | 3/2010 | Anderson |
| 2010/0063651 A1 | 3/2010 | Anderson |
| 2010/0063652 A1 | 3/2010 | Anderson |
| 2010/0063663 A1 | 3/2010 | Tolstedt et al. |
| 2010/0063664 A1 | 3/2010 | Anderson |
| 2010/0063672 A1 | 3/2010 | Anderson |
| 2010/0063673 A1 | 3/2010 | Anderson |
| 2010/0063680 A1 | 3/2010 | Tolstedt et al. |
| 2010/0063954 A1 | 3/2010 | Anderson |
| 2010/0081411 A1 | 4/2010 | Montenero |
| 2010/0131122 A1 | 5/2010 | Dersjoe et al. |

(56) References Cited

U.S. PATENT DOCUMENTS

| | | |
|---|---|---|
| 2010/0179691 A1 | 7/2010 | Gal et al. |
| 2010/0289662 A1 | 11/2010 | Dasilva et al. |
| 2010/0332061 A1 | 12/2010 | Forsloew et al. |
| 2011/0021231 A1 | 1/2011 | Burns et al. |
| 2011/0254708 A1 | 10/2011 | Anderson |
| 2012/0029761 A1 | 2/2012 | Anderson |
| 2012/0095651 A1 | 4/2012 | Anderson |
| 2012/0221172 A1 | 8/2012 | Anderson |
| 2012/0277932 A1 | 11/2012 | Anderson |
| 2013/0282200 A1 | 10/2013 | Anderson |
| 2015/0025708 A1 | 1/2015 | Anderson |

FOREIGN PATENT DOCUMENTS

| | | |
|---|---|---|
| JP | H07159285 A | 6/1995 |
| WO | WO2007051972 A1 | 5/2007 |
| WO | WO2008133394 A1 | 11/2008 |

OTHER PUBLICATIONS

Extended European Search Report, dated Apr. 10, 2014, regarding Application No. EP09176819.2, 8 pages.

Extended European Search Report, dated Oct. 10, 2014, regarding Application No. EP09168308.6, 6 pages.

Zappi et al., "Activity recognition from on-body sensors by classifier fusion: sensor scalability and robustness," Proceedings of the 3rd International Conference on Intelligent Sensors, Sensor Networks and Information (ISSNIP 2007), Dec. 2007, pp. 281-286.

Borenstein et al., "Where am I? Sensors and Methods for Mobile Robot Positioning," University of Michigan, Ann Arbor, Michigan, Apr. 1996, pp. 1-281.

"Essay—Video Production," Capitalist Lion.com, http://capitalistlion.com/essay/vid-platforms.html, published as early as Jan. 2003, retrieved on Oct. 13, 2009, 7 pages.

Deans et al., "Localization and Mapping Using Bearings Only Sensors," http://www.cs.cmu.edu/~rll/guide2001/deans/html/deans.html, published as early as Jan. 1993, retrieved on Oct. 13, 2009, 3 pages.

"Submarine Periscopes and Approach Techniques," FleetSubmarine.com, http://fleetsubmarine.com/periscope.html, published as early as Jan. 2002, retrieved on Oct. 13, 2009, 14 pages.

Hagras et al., "Online Learning of the Sensors Fuzzy Membership Functions in Autonomous Mobile Robots," Proceedings of the 2000 IEEE International Conference on Robotics and Automation, Apr. 2000, pp. 3233-3238.

Kelly, "Precision Dilution in Triangulation Based Mobile Robot Position Estimation," Proceedings of the 8th Conference Intelligent Autonomous Systems (IAS-8), Mar. 2004, 8 pages.

Kiriy, "A Localization System for Autonomous Golf Course Mowers," Masters Thesis, McGill University, Montreal, Canada, Nov. 2002, 122 pages.

Najjaran et al., "Online Map Building for Terrain Scanning Robots Using a Hybrid Neurofuzzy Kalman Filter," 2004 Annual Meeting of the North American Fuzzy Information Processing Society, Jun. 2004, vol. 2, pp. 814-819.

Stella et al., "Self-Location of a Mobile Robot with Uncertainty by Cooperation of a Heading Sensor and a CCD TV Camera," Proceedings of the 13th International Conference on Pattern Recognition, Aug. 1996, vol. 3, pp. 303-307.

Willemsen, "Plotting and Piloting—Marine Navigation Courses: Lines of Position, Position Fixes: 4 Plotting and Piloting," http://www.sailingissues.com/navcourse4.html, Oct. 12, 2009, 12 pages.

Wu, "On Optimal Deployment of Probabilistic Detectors in the Plane," System Science Master Project Defense, Louisiana State University, Baton Rouge, Louisiana, Apr. 10, 2002, 1 page. (Abstract only).

"Video Stabilization," http://www.cfar.umd.edu/~yao/video_stabilization.html, retrieved Oct. 13, 2009, 2 pages.

* cited by examiner

FIG. 8

SENSOR TABLE 800

| | NORMAL OPERATING CONDITIONS 804 | EARLY FALL 808 | WINTER 812 | NOTES |
|---|---|---|---|---|
| GPS 802 | GOOD TO POOR QUALITY SIGNAL RECEPTION 806 | GOOD TO POOR QUALITY SIGNAL RECEPTION 810 | GOOD TO VERY GOOD SIGNAL RECEPTION 814 | USE AS SEED FOR MAP MATCHING |
| VISIBLE CAMERA IMAGES OF A CURB OR STREET EDGE 816 | EXCELLENT QUALITY IMAGES 818 | UNUSABLE QUALITY IMAGES 820 | UNUSABLE QUALITY IMAGES 822 | |
| VISIBLE CAMERA IMAGES (8 FEET UP) 824 | EXCELLENT QUALITY IMAGES 826 | EXCELLENT QUALITY IMAGES 828 | GOOD TO EXCELLENT QUALITY IMAGES 830 | |
| VISIBLE CAMERA IMAGES OF THE STREET CROWN 832 | GOOD QUALITY IMAGES 834 | GOOD TO POOR QUALITY IMAGES 836 | UNUSABLE QUALITY IMAGES 838 | |
| LIDAR IMAGES OF A CURB 840 | EXCELLENT 842 | UNUSABLE 844 | UNUSABLE 844 | |
| LIDAR (8 FEET UP) 846 | EXCELLENT 848 | EXCELLENT 848 | EXCELLENT 848 | |
| LIDAR (SKY) 850 | UNUSABLE DUE TO CANOPY 852 | UNUSABLE TO POOR 854 | EXCELLENT 856 | |

|  | COLUMN 4 | COLUMN 5 |
|---|---|---|
| ROW 1 | →A - - - - -<br>- - - - - -<br>- - - - - -<br>- - - - - ←<br>→ - - - - - -<br>- - - - - -<br>- - - - - -<br>- - - - - ←<br>→ - - - - - -<br>- - - - - -<br>- - - - - -<br>- - - - - ← | →B - - - - -<br>- - - - - -<br>- - - - - -<br>- - - - - ←<br>→ - - - - - -<br>- - - - - -<br>- - - - - -<br>- - - - - ←<br>→ - - - - - -<br>- - - - - -<br>- - - - - -<br>- - - - - ← |
| ROW 2 |  | →C - - - - -<br>- - - - - -<br>- - - - - -<br>- - - - - ←<br>→ - - - - - -<br>- - - - - -<br>- - - - - -<br>- - - - - ←<br>→ - - - - - -<br>- - - - - -<br>- - - - - -<br>- - - - - ← |

FIG. 12

METHOD FOR MACHINE COORDINATION WHICH MAINTAINS LINE-OF-SITE CONTACT

CROSS REFERENCE TO RELATED APPLICATIONS

This application is a divisional of and claims the benefit of priority to U.S. patent application Ser. No. 12/903,883, filed Oct. 13, 2010, which is related to commonly assigned and co-pending U.S. patent application Ser. No. 12/208,691, filed Sep. 11, 2008, entitled "HIGH INTEGRITY PERCEPTION FOR MACHINE LOCALIZATION AND SAFEGUARDING", which is hereby incorporated by reference.

FIELD OF THE INVENTION

The preferred embodiment relates generally to coordinating a plurality of vehicle operations that are operable to perform a task, and in particular may be directed to maintaining a line-of-site communication between such plurality of vehicles to provide a fail-safe recovery mechanism due to a failure or other operating/environmental issue.

BACKGROUND OF THE INVENTION

An increasing trend towards developing automated or semi-automated equipment may be present in today's work environment. In some situations with the trend, this equipment may be completely different from the operator controlled equipment that may be replaced, and does not allow for any situations in which an operator can be present or take over operation of the vehicle.

Because of the complexity, cost, and performance of current fully autonomous systems, semi-automated equipment may be more commonly used. This type of equipment may be similar to previous operator-controlled equipment, but incorporates one or more operations that are automated rather than operator controlled. This semi-automated equipment allows for human supervision and allows the operator to take control when necessary. However, in such environments, the margin of error in operation—be it from a malfunctioning part, environmental issues, or the terrain of the work environment—may be extremely small as the machines operate autonomously without operator control. What may be needed includes a system and operating procedure to mitigate operational errors in such an environment. Therefore, it would be advantageous to have a method and apparatus to provide additional features for the navigation of vehicles.

SUMMARY

A method and system are provided that facilitates operation of autonomous equipment by providing a mission planner to maintain line-of-sight contact between a plurality of coordinated machines. The mission planner may be used when coordination needs machines to remain within a specified distance of each other to provide adequate 'positioning' accuracy, or else to provide adequate safeguarding. It may also be needed when communication or sensing signals may be blocked by earth, buildings, vegetation, and other features on a worksite. Providing such line-of-sight contact between a plurality of coordinated machines advantageously allows for the possibility of using a plurality of different mechanisms (e.g., GPS, imaging, LIDAR) that allow for recovery from a plurality of different types of errors that may be encountered.

Thus, there is provided a method for maintaining line-of-sight (LoS) communication between a plurality of machines, comprising steps of: creating a mission plan for a work site that includes a path plan for each of the plurality of machines that maintains the line-of-sight communication between the plurality of machines by taking into account a topography for the work site; and loading the path plan for each respective one of the plurality of machines into each respective one of the plurality of machines, wherein the path plan specifies a machine travel path for each respective one of the plurality of machines.

The features, functions, and advantages can be achieved independently in various embodiments or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment when read in conjunction with the accompanying drawings, wherein:

FIG. 8 includes a block diagram of a sensor selection table in a knowledge base used to select sensors for use in planning paths and obstacle avoidance in accordance with an illustrative embodiment;

FIG. 12 includes a representative mission subplan for a given LoS communication zone in accordance with an illustrative embodiment.

DESCRIPTION OF THE PREFERRED EMBODIMENT

Figure 1:
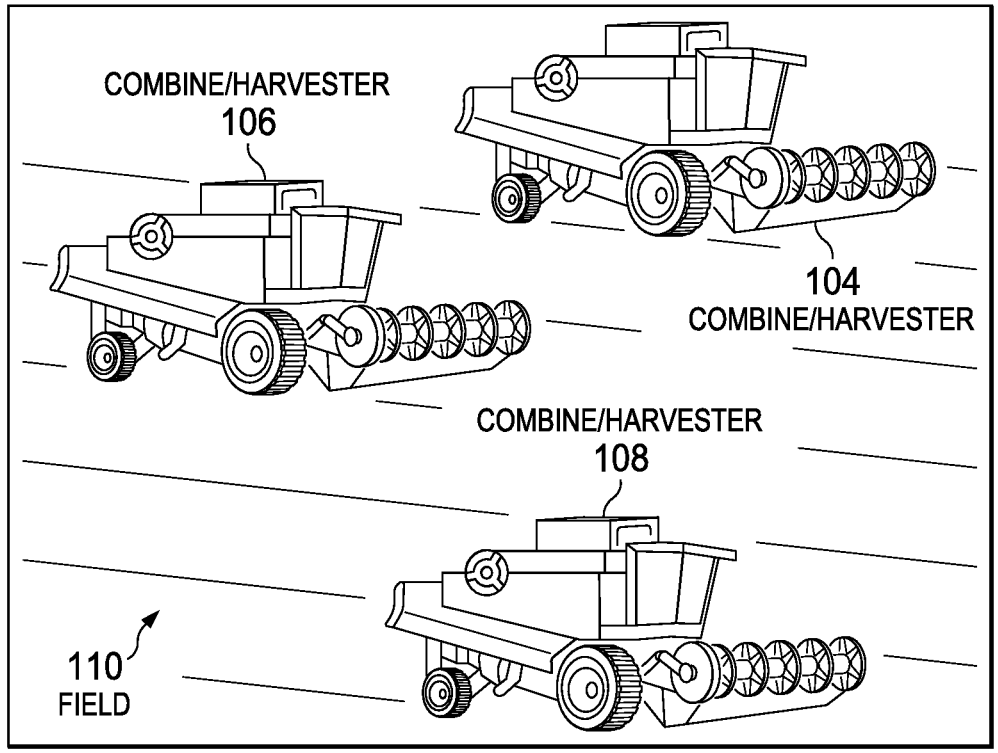
FIG. 1 includes a block diagram of multiple vehicles operating in a network environment in accordance with an illustrative embodiment.

Embodiments provide systems and methods for vehicle navigation and more particularly systems and methods for a distributed knowledge base within a vehicle for controlling operation of a vehicle. As an example, embodiments provide a method and system for utilizing a versatile robotic control module for localization and navigation of a vehicle.

Robotic or autonomous vehicles, sometimes referred to as mobile robotic platforms, generally have a robotic control system that controls the operational systems of the vehicle. In a vehicle that may be limited to a transportation function, the operational systems may include steering, braking, transmission, and throttle systems. Such autonomous vehicles generally have a centralized robotic control system for control of the operational systems of the vehicle. Some military vehicles have been adapted for autonomous operation. In the United States, some tanks, personnel carriers, Stryker vehicles, and other vehicles have been adapted for autonomous capability. Generally, these are to be used in a manned mode as well.

The different illustrative embodiments recognize that robotic control system sensor inputs may include data associated with the vehicle's destination, preprogrammed path information, and detected obstacle information. Based on such data associated with the information above, the vehicle's movements are controlled. Obstacle detection systems within a vehicle commonly use scanning lasers to scan a beam over a field of view, or cameras to capture images over a field of view. The scanning laser may cycle through an entire range of beam orientations, or provide random access to any particular orientation of the scanning beam. The camera or cameras may capture images over the broad field of view, or of a particular spectrum within the field of view. For obstacle detection applications of a vehicle, the response time for collecting image data should be rapid over a wide field of view to facilitate early recognition and avoidance of obstacles.

Off-road machine coordination needs a plurality of machines to maintain reliable "contact" with one another. "Contact" includes communications, often using line-of-sight frequencies which can be blocked by earth, buildings, vegetation, and other environmental features. This communication may be used to share information critical to coordination such as vehicle position, status, and intent.

"Contact" also includes sensing signals such as radar, lidar, and vision which are line-of-sight (LoS). These sensors on a machine can locate another machine relative to the first machine's position and orientation. "Position" and "Positioning", as used herein, comprise location, orientation, heading, speed, etc. When relative machine location and global position information are transmitted from the first machine to the second machine, the second machine can localize itself in a global coordinate system. Information from additional vehicles may be used to improve the accuracy or availability of such position information.

The second use of "contact" may be especially critical in two "positioning" situations. The first situation can be when a vehicle may be operating in a location where its own positioning system does not work and it needs to rely on information from other vehicles to determine its own position. A common example may be a Global Positioning System (GPS) receiver which does not provide accurate position due to satellite signals being blocked or attenuated by buildings, trees, hills, and the like. The second situation can be when a vehicle may not be equipped with or may have non-functioning position sensors. In this case it must totally rely on other vehicles for its own position information.

The second use of "contact" may also be critical when the sensors such as radar, lidar, and vision are used to locate obstacles and other features in the environment. Similar situations occur as in the "positioning" case. First, environmental conditions such as dust, precipitation, and fog can limit the range or quality of these line-of-site sensors in a given machine. Data from other vehicles can help fill in the gaps. Second, a vehicle may not be equipped with safeguarding sensors at all, or one or more safeguarding sensors may not be functioning.

A mission planner may thus be provided for these situations to maintain line-of-site contact between a plurality of coordinated machines. It may be used when coordination needs machines to remain within a specified distance of each other to provide adequate "positioning" accuracy, or else to provide adequate safeguarding. It may also be needed when communication or sensing signals may be blocked by earth, buildings, vegetation, and other features on a worksite.

The illustrative embodiments also recognize that in order to provide a system and method where a combination manned/autonomous vehicle accurately navigates and manages a work site, specific mechanical accommodations for processing means and location sensing devices may be needed.

With reference to the figures and in particular with reference to FIG. 1, embodiments may be used in a variety of vehicles, such as automobiles, trucks, harvesters, combines, agricultural equipment, tractors, mowers, armored vehicles, and utility vehicles. Embodiments may also be used in a single computing system or a distributed computing system. The illustrative embodiments are not meant as limitations in any way. FIG. 1 depicts a block diagram of multiple vehicles operating in a network environment in accordance with an illustrative embodiment. FIG. 1 depicts an illustrative environment including network 100 in one embodiment. In this example, back office 102 may be a single computer or a distributed computing cloud. Back office 102 supports the physical databases and/or connections to external databases which underlie the knowledge bases used in the different illustrative embodiments. Back office 102 may supply knowledge bases to different vehicles, as well as provide online access to information from knowledge bases. In this example, combine/harvesters 104, 106, and 108 may be any type of harvesting, threshing, crop cleaning, or other agricultural vehicle. In this illustrative embodiment, combine/harvesters 104, 106, and 108 operate on field 110, which may be any type of land used to cultivate crops for agricultural purposes.

In an illustrative example, combine/harvester 104 may move along field 110 following a leader using a number of different modes of operation to aid an operator in performing agricultural tasks on field 110. The modes include, for example, a side following mode, a teach and playback mode, a teleoperation mode, a path mapping mode, a straight mode, and other suitable modes of operation. An operator may be a person being followed as the leader when the vehicle may be operating in a side-following mode, a person driving the vehicle, or a person controlling the vehicle movements in teleoperation mode. A leader may be a human operator or another vehicle in the same worksite.

In one example, in the side following mode, combine/harvester 106 may be the leader and combine/harvesters 104 and 108 are the followers. In another example, in the side following mode, an operator may be the leader and combine/harvester 104 may be the follower. The side following mode may include preprogrammed maneuvers in which an operator may change the movement of combine/harvester 104 from an otherwise straight travel path for combine/harvester 104. For example, if an obstacle may be detected in field 110, the operator may initiate a go around obstacle maneuver that causes combine/harvester 104 to steer out and around an obstacle in a preset path. With this mode, automatic obstacle identification and avoidance features may still be used. With the teach and playback mode, for example, an operator may drive combine/harvester 104 along a path on field 110 without stops, generating a mapped path. After driving the path, the operator may move combine/harvester 104 back to the beginning of the mapped path at a later time. In the second pass on field 110, the operator may cause combine/harvester 104 to drive the mapped path from start point to end point without stopping, or may cause combine/harvester 104 to drive the mapped path with stops along the mapped path. In this manner, combine/harvester 104 drives from start to finish along the mapped path.

In a related alternative embodiment, combine/harvester 104 of FIG. 1 may be two different seasonal vehicles. For example, in the spring combine/harvester 104 may be a tractor/planter used to plant a spring crop, and performs the field mapping operations as described above. Then, in the fall, combine/harvester 104 may be a combine/harvester that operates in conjunction with combine/harvesters 106 and 108 as described herein, using the mapping data acquired in the spring from the tractor/planter.

Combine/harvester 104 still may include some level of obstacle detection to prevent combine/harvester 104 from running over or hitting an obstacle, such as a field worker or another agricultural vehicle, such as combine/harvester 106 and 108.

In a teleoperation mode, for example, an operator may operate and/or wirelessly drive combine/harvester 104 across field 110 in a fashion similar to other remote controlled vehicles. With this type of mode of operation, the operator may control combine/harvester 104 through a wireless controller.

In a path mapping mode, the different paths may be mapped by an operator prior to reaching field 110. In a crop spraying example, routes may be identical for each trip and the operator may rely on the fact that combine/harvester 104 will move along the same path each time. Intervention or deviation from the mapped path may occur only when an obstacle may be present. Again, with the path mapping mode, way points may be set to allow combine/harvester 104 to stop or turn at certain points along field 110.

In a straight mode, combine/harvester 106 may be placed in the middle or offset from some distance from a boundary, field edge, or other vehicle on field 110. In a grain harvesting example, combine/harvester 106 may move down field 110 along a straight line allowing one or more other vehicles, such as combine/harvester 104 and 108, to travel in a parallel path on either side of combine/harvester 106 to harvest rows of grain. In this type of mode of operation, the path of combine/harvester 106 may always be straight unless an obstacle may be encountered. In this type of mode of operation, an operator may start and stop combine/harvester 106 as needed. This type of mode may minimize the intervention needed by a driver.

In different illustrative embodiments, the different types of modes of operation may be used in combination to achieve the desired goals. In these examples, at least one of these modes of operation may be used to minimize driving while maximizing safety and efficiency in a harvesting process. In these examples, each of the different types of vehicles depicted may utilize each of the different types of modes of operation to achieve desired goals. As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C. As another example, at least one of item A, item B, and item C may include item A, two of item B, and 4 of item C or some other combination types of items and/or number of items.

In different illustrative embodiments, dynamic conditions impact the movement of a vehicle. A dynamic condition may be a change in the environment around a vehicle. For example, a dynamic condition may include, without limitation, movement of another vehicle in the environment to a new location, detection of an obstacle, detection of a new object or objects in the environment, receiving user input to change the movement of the vehicle, receiving instructions from a back office, such as back office 102, and the like. In response to a dynamic condition, the movement of a vehicle may be altered in various ways, including, without limitation, stopping the vehicle, accelerating propulsion of the vehicle, decelerating propulsion of the vehicle, and altering the direction of the vehicle, for example.

Further, autonomous routes may include several line segments. In other examples, a path may go around blocks in a square or rectangular pattern or follow field contours or boundaries. Of course, other types of patterns also may be used depending upon the particular implementation. Routes and patterns may be performed with the aid of a knowledge base in accordance with an illustrative embodiment. In these examples, an operator may drive combine/harvester 104 onto a field or to a beginning position of a path. The operator also may monitor combine/harvester 104 for safe operation and ultimately provide overriding control for the behavior of combine/harvester 104.

In these examples, a path may be a preset path, a path that may continuously be planned with changes made by combine/harvester 104 to follow a leader in a side following mode, a path that may be directed by an operator using a remote control in a teleoperation mode, or some other path. The path may be any length depending on the implementation. Paths may be stored and accessed with the aid of a knowledge base in accordance with an illustrative embodiment.

In these examples, heterogeneous sets of redundant sensors are located on multiple vehicles in a worksite to provide high integrity perception with fault tolerance. Redundant sensors in these examples are sensors that may be used to compensate for the loss and/or inability of other sensors to obtain information needed to control a vehicle. A redundant use of the sensor sets are governed by the intended use of each of the sensors and their degradation in certain dynamic conditions. The sensor sets robustly provide data for localization and/or safeguarding in light of a component failure or a temporary environmental condition. For example, dynamic conditions may be terrestrial and weather conditions that affect sensors and their ability to contribute to localization and safeguarding. Such conditions may include, without limitation, sun, clouds, artificial illumination, full moon light, new moon darkness, degree of sun brightness based on sun position due to season, shadows, fog, smoke, sand, dust, rain, snow, and the like.

Thus, the different illustrative embodiments provide a number of different modes to operate a number of different vehicles, such as combine/harvesters 104, 106, and 108. Although FIG. 1 illustrates a vehicle for agricultural work, this illustration is not meant to limit the manner in which different modes may be applied. For example, the different illustrative embodiments may be applied to other types of vehicles and other types of uses. As a specific example, the different illustrative embodiments may be applied to a military vehicle in which a soldier uses a side following mode to provide a shield across a clearing. In other embodiments, the vehicle may be a compact utility vehicle and have a chemical sprayer mounted and follow an operator as the operator applies chemicals to crops or other foliage. These types of modes also may provide obstacle avoidance and remote control capabilities. As yet another example, the different illustrative embodiments may be applied to delivery vehicles, such as those for the post office or other commercial delivery vehicles. The illustrative embodiments recognize a need for a system and method where a combination manned/autonomous vehicle can accurately navigate and manage a work site. Therefore, the illustrative embodiments provide a computer implemented method, apparatus, and computer program product for controlling a vehicle. A dynamic condition may be identified using a plurality of sensors on the vehicle and the vehicle may be controlled using a knowledge base.

Figure 2A:
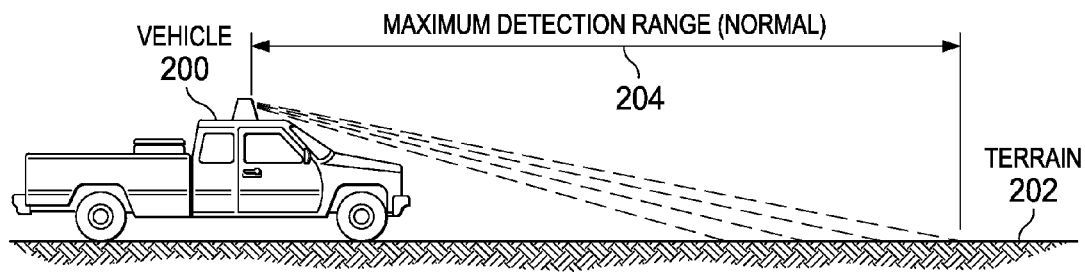
FIGS. 2A and 2B are block diagrams illustrating vehicle perception used to adjust navigation in accordance with an illustrative embodiment.
Figure 2B:
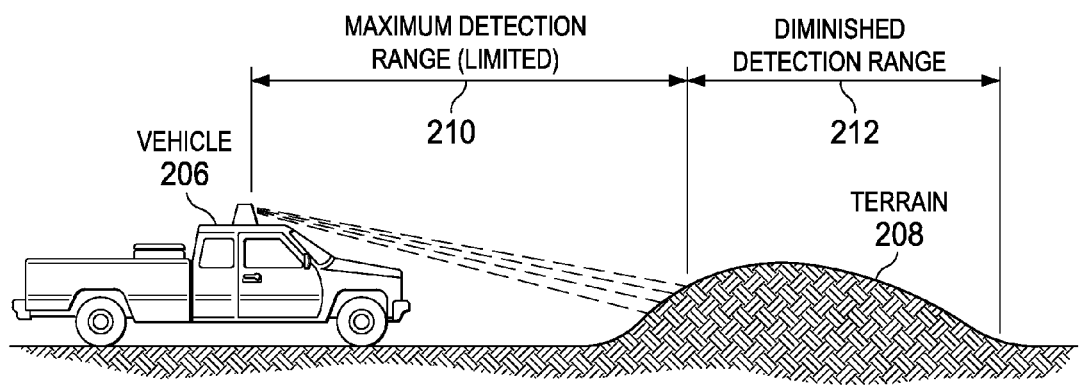

With reference now to FIGS. 2A and 2B, a block diagram illustrating vehicle perception used to adjust navigation may be depicted in accordance with an illustrative embodiment. Vehicles 200 and 206 are examples of one or more of combine/harvesters 104, 106, and 108 in FIG. 1. Vehicle 200 travels across terrain 202 using sensors located on vehicle 200 to perceive attributes of the terrain. In normal operating conditions, max detection range 204 of the sensors on vehicle 200 offers good visibility of upcoming terrain in the path of vehicle 200. Vehicle 206 travels across terrain 208, which limits max detection range 210 and provides diminished detection range 212. Terrain 208 may be, for example, a structure or vegetation obscuring visibility, land topography limiting the sensors range of detection, and the like. Vehicle 206 may adjust the speed and following distance based upon the detection range available. For example, when approaching terrain 208 with diminished detection range 212, vehicle 206 may slow its speed in order to provide adequate response time for actions such as obstacle detection, obstacle avoidance, and emergency stopping. In an illustrative embodiment, vehicle 200 and vehicle 206 may be working in different areas of the same worksite. When vehicle 206 experiences diminished detection range 212, vehicle 206 may request sensor data information from vehicle 200. Sensor data may be any data generated by a sensor. For example, diminished detection range 212 may be due to degradation of global positioning system capabilities based on the tree canopy of terrain 208. Vehicle 200, however, may be operating on a parallel or nearby path within the same worksite, but away from the tree canopy of terrain 208, with terrain 202 providing the global positioning system receiver located on vehicle 200 an unhindered ability to receive signals. The sensor system of vehicle 200 may determine a position estimate for vehicle 200, and a relative position estimate of vehicle 206 based on other sensors detecting the distance, speed, and location of vehicle 206. Vehicle 200 may then transmit localization information to vehicle 206, and vehicle 206 may use the information from the sensor system of vehicle 200 to determine a position estimate for vehicle 206 and thereby maintain vehicle speed and progression along the planned path.

Figure 3:
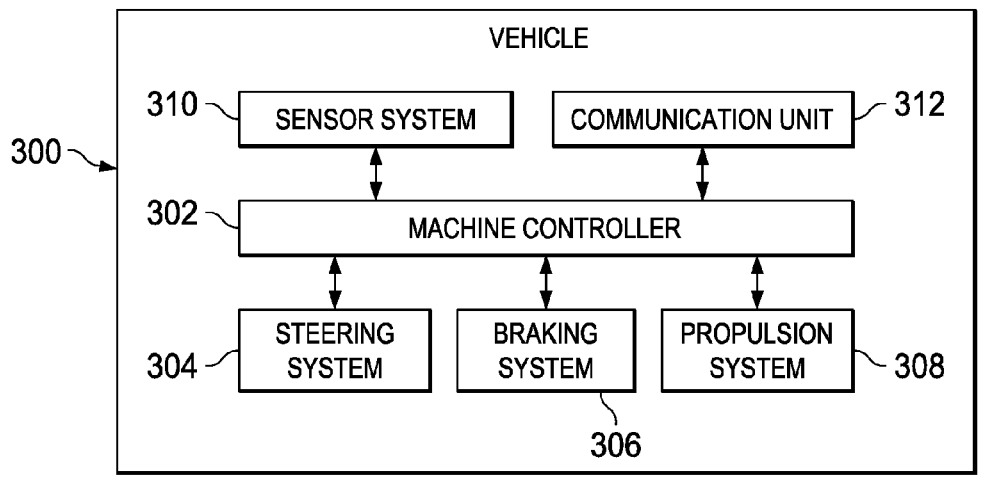
FIG. 3 includes a block diagram of components used to control a vehicle in accordance with an illustrative embodiment.

With reference now to FIG. 3, a block diagram of components used to control a vehicle may be depicted in accordance with an illustrative embodiment. In this example, vehicle 300 may be an example of a vehicle, such as combine/harvesters 104, 106, and 108 in FIG. 1. Vehicle 300 may also be an example of vehicle 200 and vehicle 206 in FIGS. 2A and 2B. In this example, vehicle 300 includes machine controller 302, steering system 304, braking system 306, propulsion system 308, sensor system 310, and communication unit 312.

Machine controller 302 may be, for example, a data processing system or some other device that may execute processes to control movement of a vehicle. Machine controller 302 may be, for example, a computer, an application integrated specific circuit, or some other suitable device. Machine controller 302 may execute processes to control steering system 304, braking system 306, and propulsion system 308 to control movement of the vehicle. Machine controller 302 may send various commands to these components to operate the vehicle in different modes of operation. These commands may take various forms depending on the implementation. For example, the commands may be analog electrical signals in which a voltage and/or current change may be used to control these systems. In other implementations, the commands may take the form of data sent to the systems to initiate the desired actions. Steering system 304 may control the direction or steering of the vehicle in response to commands received from machine controller 302. Steering system 304 may be, for example, an electrically controlled hydraulic steering system, an electrically driven rack and pinion steering system, an Ackerman steering system, or some other suitable steering system. Braking system 306 may slow down and/or stop the vehicle in response to commands from machine controller 302. Braking system 306 may be an electrically controlled braking system. This braking system may be, for example, a hydraulic braking system, a friction braking system, a regenerative braking system, or some other suitable braking system that may be electrically controlled.

In these examples, propulsion system 308 may propel or move the vehicle in response to commands from machine controller 302. Propulsion system 308 may maintain or increase the speed at which a vehicle moves in response to instructions received from machine controller 302. Propulsion system 308 may be an electrically controlled propulsion system. Propulsion system 308 may be, for example, an internal combustion engine, an internal combustion engine/electric hybrid system, an electric engine, or some other suitable propulsion system.

Sensor system 310 may be a set of sensors used to collect information about the environment around vehicle 300. This information collected by sensor system 310 may be used for localization in identifying a location of vehicle 300 or a location of another vehicle in the environment. In these examples, the information may be sent to machine controller 302 to provide data in identifying how the vehicle should move in different modes of operation. For example, braking system 306 may slow vehicle 300 in response to a limited detection range of sensor system 310 on vehicle 300, such as diminished detection range 212 in FIG. 2B. In these examples, a set refers to one or more items. A set of sensors may be one or more sensors in these examples.

Communication unit 312 may provide communications links to machine controller 302 to receive information. This information includes, for example, data, commands, and/or instructions. Communication unit 312 may take various forms. For example, communication unit 312 may include a wireless communications system, such as a cellular phone system, a Wi-Fi wireless system, a Bluetooth wireless system, or some other suitable wireless communications system. Further, communication unit 312 also may include a communications port, such as, for example, a universal serial bus port, a serial interface, a parallel port interface, a network interface, or some other suitable port to provide a physical communications link. Communication unit 312 may be used to communicate with a remote location or an operator. Communications unit 312 may include a battery back-up on a plurality of electronic modules that each operates at a different frequency in order to minimize the likelihood of common mode failure.

Figure 4:
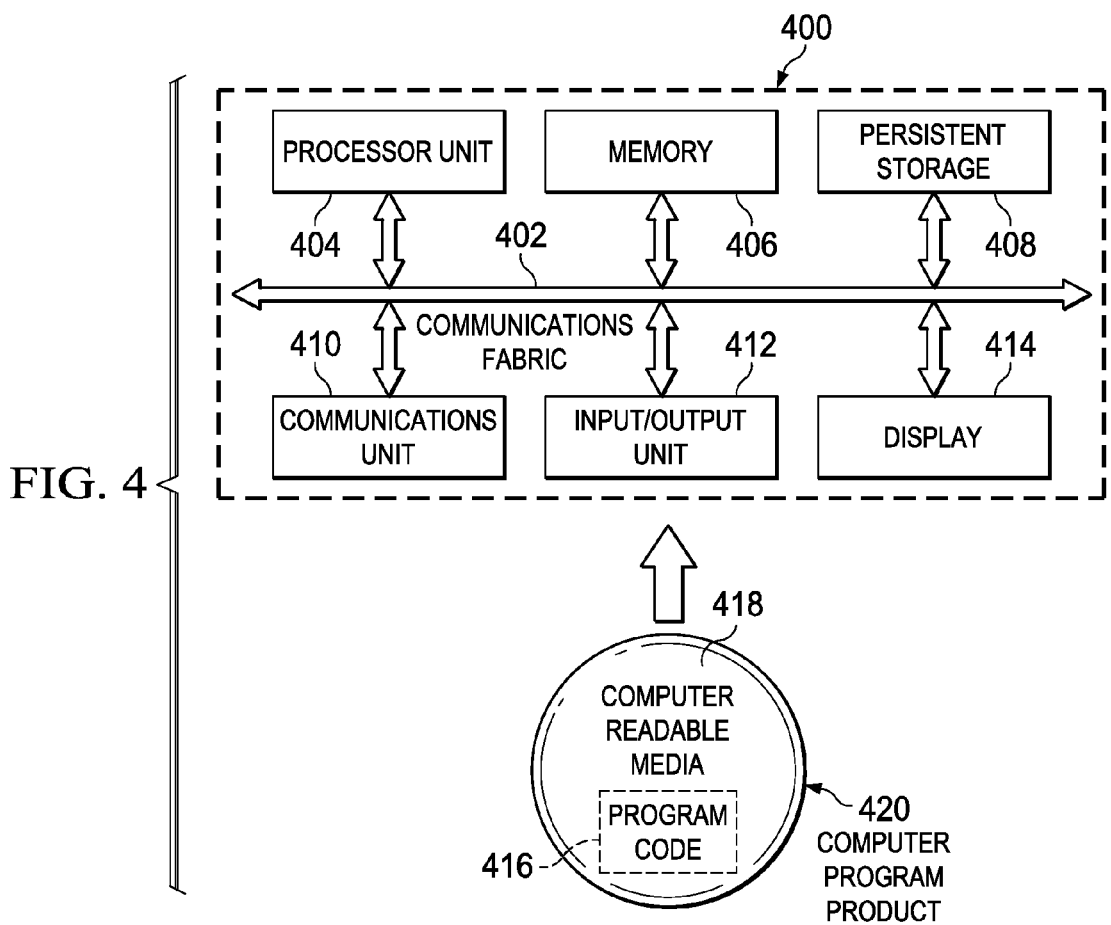
FIG. 4 includes a block diagram of a data processing system in accordance with an illustrative embodiment.

With reference now to FIG. 4, a block diagram of a data processing system may be depicted in accordance with an illustrative embodiment. Data processing system 400 may be an example of one manner in which machine controller 302 in FIG. 3 may be implemented. In this illustrative example, data processing system 400 includes communications fabric 402, which provide communication between processor unit 404, memory 406, persistent storage 408, communications unit 410, input/output (I/O) unit 412, and display 414. Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor may be present with secondary processors on a single chip. As another illustrative example, processor unit 404 may be a symmetric multiprocessor system containing multiple processors of the same type. Memory 406 and persistent storage 408 are examples of storage devices. A storage device may be any piece of hardware that may be capable of storing information either on a temporary basis and/or a permanent basis. Memory 406, in these examples, may be, for example, a random access memory or any other suitable volatile or non-volatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above.

The media used by persistent storage 408 also may be removable. For example, a removable hard drive may be used for persistent storage 408. Communications unit 410, in these examples, provides for communications with other data processing systems or devices. In these examples, communications unit 410 may be a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user. Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as program code, computer usable program code, or computer readable program code that may be read and executed by a processor in processor unit 404. The program code in the different embodiments may be embodied on different physical or tangible computer readable media, such as memory 406 or persistent storage 408. Program code 416 may be located in a functional form on computer readable media 418 that may be selectively removable and may be loaded onto or transferred to data processing system 400 for execution by processor unit 404. Program code 416 and computer readable media 418 form computer program product 420 in these examples. In one example, computer readable media 418 may be in a tangible form, such as, for example, an optical or magnetic disc that may be inserted or placed into a drive or other device that may be part of persistent storage 408 for transfer onto a storage device, such as a hard drive that may be part of persistent storage 408. In a tangible form, computer readable media 418 also may take the form of a persistent storage, such as a hard drive, a thumb drive, or a flash memory that may be connected to data processing system 400. The tangible form of computer readable media 418 may also be referred to as computer recordable storage media. In some instances, computer readable media 418 may not be removable. Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. As one example, a storage device in data processing system 400 may be any hardware apparatus that may store data. Memory 406, persistent storage 408, and computer readable media 418 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache, such as found in an interface and memory controller hub that may be present in communications fabric 402.

Figure 5:
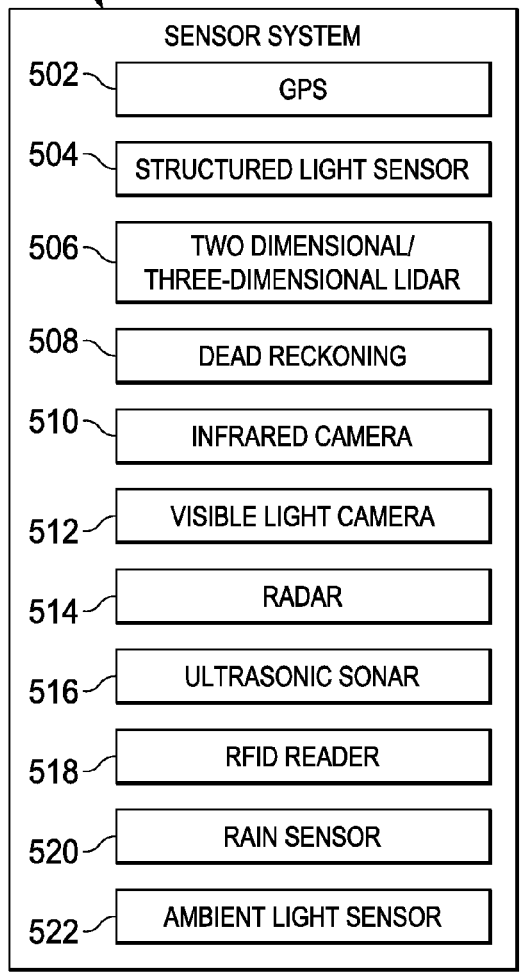
FIG. 5 includes a block diagram of a sensor system in accordance with an illustrative embodiment.

With reference now to FIG. 5, a block diagram of a sensor system may be depicted in accordance with an illustrative embodiment. Sensor system 500 may be an example of one implementation of sensor system 310 in FIG. 3. Sensor system 500 includes redundant sensors. A redundant sensor in these examples may be a sensor that may be used to compensate for the loss and/or inability of another sensor to obtain information needed to control a vehicle. A redundant sensor may be another sensor of the same type (homogenous) and/or a different type of sensor (heterogeneous) that may be capable of providing information for the same purpose as the other sensor.

As illustrated, sensor system 500 includes, for example, global positioning system 502, structured light sensor 504, two dimensional/three dimensional lidar 506, dead reckoning 508, infrared camera 510, visible light camera 512, radar 514, ultrasonic sonar 516, radio frequency identification reader 518, rain sensor 520, and ambient light sensor 522. These different sensors may be used to identify the environment around a vehicle. For example, these sensors may be used to detect terrain in the path of a vehicle, such as terrain 202 and 208 in FIGS. 2A and 2B. In another example, these sensors may be used to detect a dynamic condition in the environment. The sensors in sensor system 500 may be selected such that one of the sensors may always be capable of sensing information needed to operate the vehicle in different operating environments.

Global positioning system 502 may identify the location of the vehicle with respect to other objects in the environment. Global positioning system 502 may be any type of radio frequency triangulation scheme based on signal strength and/or time of flight. Examples include, without limitation, the Global Positioning System, Glonass, Galileo, and cell phone tower relative signal strength. Position may typically be reported as latitude and longitude with an error that depends on factors, such as ionispheric conditions, satellite constellation, and signal attenuation from vegetation.

Structured light sensor 504 emits light in a pattern, such as one or more lines, reads back the reflections of light through a camera, and interprets the reflections to detect and measure objects in the environment. Two dimensional/three dimensional lidar 506 may be an optical remote sensing technology that measures properties of scattered light to find range and/or other information of a distant target. Two dimensional/three dimensional lidar 506 emits laser pulses as a beam, than scans the beam to generate two dimensional or three dimensional range matrices. The range matrices are used to determine distance to an object or surface by measuring the time delay between transmission of a pulse and detection of the reflected signal.

Dead reckoning 508 begins with a known position, which may then be advanced, mathematically or directly, based upon known speed, elapsed time, and course. The advancement based upon speed may use the vehicle odometer, or ground speed radar, to determine distance traveled from the known position. Infrared camera 510 detects heat indicative of a living thing versus an inanimate object. An infrared camera may also form an image using infrared radiation.

Visible light camera 512 may be a standard still-image camera, which may be used alone for color information or with a second camera to generate stereoscopic or three dimensional images. When visible light camera 512 may be used along with a second camera to generate stereoscopic images, the two or more cameras may be set with different exposure settings to provide improved performance over a range of lighting conditions. Visible light camera 512 may also be a video camera that captures and records moving images.

Radar 514 uses electromagnetic waves to identify the range, altitude, direction, or speed of both moving and fixed objects. Radar 514 is well known in the art, and may be used in a time of flight mode to calculate distance to an object, as well as Doppler mode to calculate the speed of an object. Ultrasonic sonar 516 uses sound propagation on an ultrasonic frequency to measure the distance to an object by measuring the time from transmission of a pulse to reception and converting the measurement into a range using the known speed of sound. Ultrasonic sonar 516 is well known in the art and can also be used in a time of flight mode or Doppler mode, similar to radar 514. Radio frequency identification reader 518 relies on stored data and remotely retrieves the data using devices called radio frequency identification (RFID) tags or transponders. Rain sensor 520 detects precipitation on an exterior surface of the vehicle. Ambient light sensor 522 measures the amount of ambient light in the environment.

Sensor system 500 may retrieve environmental data from one or more of the sensors to obtain different perspectives of the environment. For example, sensor system 500 may obtain visual data from visible light camera 512, data about the distance of the vehicle in relation to objects in the environment from two dimensional/three dimensional lidar 506, and location data of the vehicle in relation to a map from global positioning system 502.

Sensor system 500 may be capable of detecting objects even in different operating environments. For example, global positioning system 502 may be used to identify a position of the vehicle. If a field may be surrounded by trees with thick canopies during the spring, global positioning system 502 may be unable to provide location information on some areas of the field. In this situation, visible light camera 512 and/or two-dimensional/three-dimensional lidar 506 may be used to identify a location of the vehicle relative to non-mobile objects, such as telephone poles, trees, roads and other suitable landmarks.

In addition to receiving different perspectives of the environment, sensor system 500 provides redundancy in the event of a sensor failure, which facilitates high-integrity operation of the vehicle. For example, in an illustrative embodiment, if visible light camera 512 may be the primary sensor used to identify the location of the operator in side-following mode, and visible light camera 512 fails, radio frequency identification reader 518 will still detect the location of the operator through a radio frequency identification tag worn by the operator, thereby providing redundancy for safe operation of the vehicle.

Figure 6:
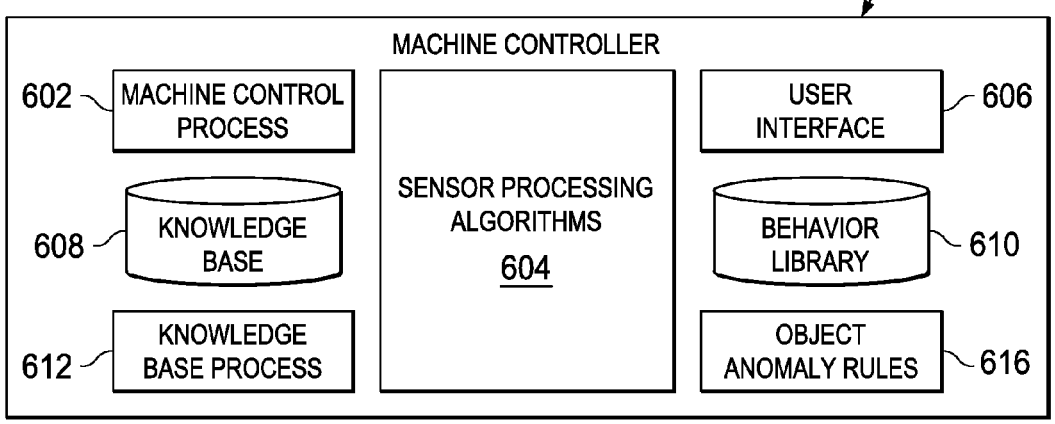
FIG. 6 includes a block diagram of functional software components that may be implemented in a machine controller in accordance with an illustrative embodiment.

With reference now to FIG. 6, a block diagram of functional software components that may be implemented in a machine controller may be depicted in accordance with an illustrative embodiment. In this example, different functional software components that may be used to control a vehicle are illustrated. The vehicle may be a vehicle such as combine/harvesters 104, 106, and 108 in FIG. 1. Machine controller 600 may be implemented in a vehicle, such as vehicle 200 and vehicle 206 in FIGS. 2A and 2B or vehicle 300 in FIG. 3 using a data processing system, such as data processing system 400 in FIG. 4. In this example machine control process 602, sensor processing algorithms 604, user interface 606, knowledge base 608, behavior library 610, knowledge base process 612, and object anomaly rules 616 are present in machine controller 600.

Machine control process 602 transmits signals to steering, braking, and propulsion systems, such as steering system 304, braking system 306, and propulsion system 308 in FIG. 3. Machine control process 602 may also transmit signals to components of a sensor system, such as sensor system 500 in FIG. 5. For example, in an illustrative embodiment, machine control process 602 transmits a signal to a camera component of sensor system 500 in order to pan, tilt, or zoom a lens of the camera to acquire different images and perspectives of an environment around the vehicle. Machine control process 602 may also transmit signals to sensors within sensor system 500 in order to activate, deactivate, or manipulate the sensor itself. Sensor processing algorithms 604 receive sensor data from sensor system 500 and classify the sensor data into thematic features. This classification may include identifying objects that have been detected in the environment. For example, sensor processing algorithms 604 may classify an object as a person, telephone pole, tree, road, light pole, driveway, fence, vehicle, or some other type of object. The classification may be performed to provide information about objects in the environment. This information may be used to generate a thematic map, which may contain a spatial pattern of attributes. The attributes may include classified objects. The classified objects may include dimensional information, such as, for example, location, height, width, color, and other suitable information. This map may be used to plan actions for the vehicle. The action may be, for example, planning paths to follow an operator in a side following mode or performing object avoidance.

The classification may be done autonomously or with the aid of user input through user interface 606. For example, in an illustrative embodiment, sensor processing algorithms 604 receive data from a laser range finder, such as two dimensional/three dimensional lidar 506 in FIG. 5, identifying points in the environment. User input may be received to associate a data classifier with the points in the environment, such as, for example, a data classifier of "tree" associated with one point, and "fence" with another point. Tree and fence are examples of thematic features in an environment. Sensor processing algorithms 604 then interact with knowledge base 608 to locate the classified thematic features on a thematic map stored in knowledge base 608, and calculate the vehicle position based on the sensor data in conjunction with the landmark localization. Machine control process 602 receive the environmental data from sensor processing algorithms 604, and interact with knowledge base 608 and behavior library 610 in order to determine which commands to send to the vehicle's steering, braking, and propulsion components.

Sensor processing algorithms 604 analyze sensor data for accuracy and fuses selected sensor data to provide a single value that may be shared with other machines. Analyzing the sensor data for accuracy involves determining an accuracy level for the sensor data based on the sensor data relative to other sensor data and the confidence level in the sensor. For example, with global positioning data from a global positioning system receiver, the reported change in position in latitude and longitude may be compared with radar and wheel-based odometry. If the global positioning system distance may be a certain percentage different from two close values from other sources, it may be considered an outlier. The distance may also be compared to a theoretical maximum distance a vehicle could move in a given unit of time. Alternately, the current satellite geometric dilution of precision could be used to validate the latitude and longitude for use in further computations. The accuracy level will influence which sensor data may be fused and which sensor data may be considered an outlier. Outliers are determined using statistical methods commonly known in the field of statistics. Sensor data may be fused by mathematically processing the sensor data to obtain a single value used to determine relative position. Examples of this mathematical processing include, but are not limited to, simple averaging, weighted averaging, and median filtering. Component failures of a sensor system on a vehicle can then be detected by comparing the position and environment information provided by each sensor or fused set of sensors. For example, if a sensor may be out of a margin of error for distance, angle, position, and the like, it may be likely that the sensor may have failed or may be compromised and should be removed from the current calculation. Repeated excessive errors are grounds for declaring the sensor failed until a root cause may be eliminated, or until the sensor may be repaired or replaced.

In an illustrative embodiment, a global positioning system, such as global positioning system 502 of sensor system 500 in FIG. 5, on a vehicle, such as combine/harvester 106 in FIG. 1, determines its own position. Furthermore, it detects the position of another vehicle, such as combine/harvester 104, as being fifty feet ahead and thirty degrees to its left. One visible light camera, such as visible light camera 512 in FIG. 5, on combine/harvester 106 detects combine/harvester 104 as being forty-eight feet ahead and twenty-eight degrees left, while another visible light camera on combine/harvester 106 detects combine/harvester 104 as being forty-nine feet ahead and twenty-nine degrees left. A lidar, such as two dimensional/three dimensional lidar 506 in FIG. 5, on combine/harvester 106 detects combine/harvester 104 as being fifty-one feet ahead and thirty degrees left. Sensor processing algorithms 604 receive the sensor data from the global positioning system, visible light cameras, and lidar, and fuse them together using a simple average of distances and angles to determine the relative position of combine/harvester 104 as being 49.5 feet ahead and 29.5 degrees left.

These illustrative examples are not meant as limitations in any way. Multiple types of sensors and sensor data may be used to perform multiple types of localization. For example, the sensor data may be fused to determine the location of an object in the environment, or for obstacle detection. Sensor data analysis and fusion may also be performed by machine control process 602 in machine controller 600.

Knowledge base 608 contains information about the operating environment, such as, for example, a fixed map showing streets, structures, tree locations, and other static object locations. Knowledge base 608 may also contain information, such as, without limitation, local flora and fauna of the operating environment, current weather for the operating environment, weather history for the operating environment, specific environmental features of the work area that affect the vehicle, and the like. The information in knowledge base 608 may be used to perform classification and plan actions. Knowledge base 608 may be located entirely in machine controller 600 or parts or all of knowledge base 608 may be located in a remote location that may be accessed by machine controller 600. Behavior library 610 contains various behavioral processes specific to machine coordination that can be called and executed by machine control process 602. In one illustrative embodiment, there may be multiple copies of behavior library 610 on machine controller 600 in order to provide redundancy. The library may be accessed by machine control process 602.

Knowledge base process 612 interacts with sensor processing algorithms 604 to receive processed sensor data about the environment, and in turn interacts with knowledge base 608 to classify objects detected in the processed sensor data. Knowledge base process 612 also informs machine control process 602 of the classified objects in the environment in order to facilitate accurate instructions for machine control process 602 to send to steering, braking, and propulsion systems. For example, in an illustrative embodiment, sensor processing algorithms 604 detects tall, narrow, cylindrical objects along the side of the planned path. Knowledge base process 612 receives the processed data from sensor processing algorithms 604 and interacts with knowledge base 608 to classify the tall, narrow, cylindrical objects as tree trunks. Knowledge base process 612 can then inform machine control process 602 of the location of the tree trunks in relation to the vehicle, as well as any further rules that may apply to tree trunks in association with the planned path.

Object anomaly rules 616 provide machine control process 602 instructions on how to operate the vehicle when an anomaly occurs, such as sensor data received by sensor processing algorithms 604 being incongruous with environmental data stored in knowledge base 608. For example, object anomaly rules 616 may include, without limitation, instructions to alert the operator via user interface 606 or instructions to activate a different sensor in sensor system 500 in FIG. 5 in order to obtain a different perspective of the environment.

Figure 7:
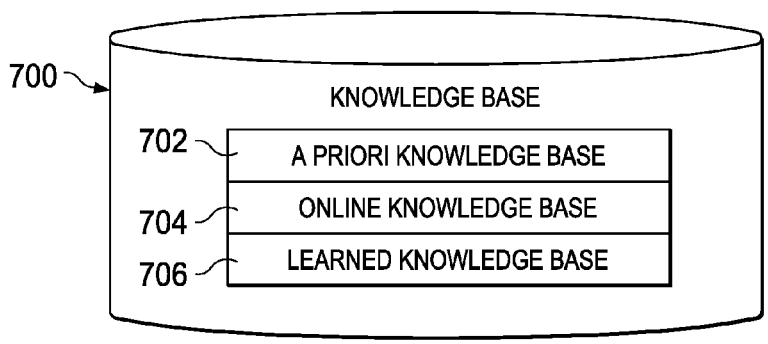
FIG. 7 includes a block diagram of a knowledge base in accordance with an illustrative embodiment.

With reference now to FIG. 7, a block diagram of a knowledge base may be depicted in accordance with an illustrative embodiment. Knowledge base 700 may be an example of a knowledge base component of a machine controller, such as knowledge base 608 of machine controller 600 in FIG. 6. For example, knowledge base 700 may be, without limitation, a component of a navigation system, an autonomous machine controller, a semi-autonomous machine controller, or may be used to make management decisions regarding work site activities. Knowledge base 700 includes a priori knowledge base 702, online knowledge base 704, and learned knowledge base 706.

A priori knowledge base 702 contains static information about the operating environment of a vehicle. Types of information about the operating environment of a vehicle may include, without limitation, a fixed map showing streets, structures, trees, and other static objects in the environment; stored geographic information about the operating environment; and weather patterns for specific times of the year associated with the operating environment. A priori knowledge base 702 may also contain fixed information about objects that may be identified in an operating environment, which may be used to classify identified objects in the environment. This fixed information may include attributes of classified objects, for example, an identified object with attributes of tall, narrow, vertical, and cylindrical, may be associated with the classification of "telephone pole." A priori knowledge base 702 may further contain fixed work site information. A priori knowledge base 702 may be updated based on information from online knowledge base 704, and learned knowledge base 706.

Online knowledge base 704 may be accessed with a communications unit, such as communication unit 312 in FIG. 3, to wirelessly access the Internet. Online knowledge base 704 dynamically provides information to a machine control process which enables adjustment to sensor data processing, site-specific sensor accuracy calculations, and/or exclusion of sensor information. For example, online knowledge base 704 may include current weather conditions of the operating environment from an online source. In some examples, online knowledge base 704 may be a remotely accessed knowledge base. This weather information may be used by machine control process 602 in FIG. 6 to determine which sensors to activate in order to acquire accurate environmental data for the operating environment. Weather, such as rain, snow, fog, and frost may limit the range of certain sensors, and may need an adjustment in attributes of other sensors in order to acquire accurate environmental data from the operating environment. Other types of information that may be obtained include, without limitation, vegetation information, such as foliage deployment, leaf drop status, and lawn moisture stress, and construction activity, which may result in landmarks in certain regions being ignored.

In another illustrative environment, online knowledge base 704 may be used to note when certain activities are in process that affect operation of sensor processing algorithms in machine controller 600 in FIG. 6. For example, if tree pruning may be in progress, a branch matching algorithm should not be used, but a tree trunk matching algorithm may still be used, as long as the trees are not being cut down completely. When the machine controller receives user input signaling that the pruning process may be over, the sensor system may collect environmental data to analyze and update a priori knowledge base 702.

Learned knowledge base 706 may be a separate component of knowledge base 700, or alternatively may be integrated with a priori knowledge base 702 in an illustrative embodiment. Learned knowledge base 706 contains knowledge learned as the vehicle spends more time in a specific work area, and may change temporarily or long-term depending upon interactions with online knowledge base 704 and user input. For example, learned knowledge base 706 may detect the absence of a tree that was present the last time it received environmental data from the work area. Learned knowledge base 706 may temporarily change the environmental data associated with the work area to reflect the new absence of a tree, which may later be permanently changed upon user input confirming the tree was in fact cut down. Learned knowledge base 706 may learn through supervised or unsupervised learning.

With reference now to FIG. 8, a block diagram of a format in a knowledge base used to select sensors for use in planning paths and obstacle avoidance may be depicted in accordance with an illustrative embodiment. This format may be used by knowledge base process 612 and machine control process 602 in FIG. 6. The format may be depicted in sensor table 800 illustrating heterogeneous sensor redundancy for localization of a vehicle on a street. This illustrative embodiment is not meant as a limitation in any way. Other illustrative embodiments may use this format for localization of a vehicle on a field, golf course, off-road terrain, and other geographical areas.

Global positioning systems 802 would likely not have real time kinematic accuracy in a typical street environment due to structures and vegetation. Normal operating conditions 804 would provide good to poor quality signal reception 806 because the global positioning system signal reception quality would depend upon the thickness of the tree canopy over the street. In early fall 808, when some leaves are still on the trees and others are filling the gutter or ditch alongside the road, the canopy thickness may offer good to poor quality signal reception 810. However, in winter 812, when trees other than evergreens tend to have little to no leaves, signal reception may be good to very good 814. Visible camera images of a curb or street edge 816 might offer excellent quality images 818 in normal operating conditions 804. However, in early fall 808 and winter 812, when leaves or snow obscure curb or street edge visibility, visible camera images would offer unusable quality images 820 and 822.

Visible camera images 824 of the area around the vehicle, with an image height of eight feet above the ground, would offer excellent quality images 826, 828, and 830 in most seasons, although weather conditions such as rain or fog may render the images unusable. Landmarks identified at eight feet above the ground include objects such as, without limitation, houses, light poles, and tree trunks. This height may typically be below tree canopies and above transient objects, such as cars, people, bikes, and the like, and provides a quality zone for static landmarks. Visible camera images of the street crown 832 may offer good quality images 834 in normal operating conditions 804. The street crown may typically be the center of the street pavement, and images of the pavement may be used in a pavement pattern matching program for vehicle localization.

In early fall 808, when leaves begin to fall and partially obscure the pavement, visible camera images of the street crown 832 may be good to poor quality images 836 depending on the amount of leaves on the ground. In winter 812, the visible camera images of the street crown 832 may be unusable quality images 838 due to fresh snow obscuring the pavement. Lidar images of a curb 840 using pulses of light may be excellent 842 for detecting a curb or ground obstacle in normal operating conditions 804, but may be unusable 844 when curb visibility may be obscured by leaves in early fall 808 or snow in winter 812. Lidar detection of the area eight feet above the ground 846 around the vehicle may be excellent 848 in normal operating conditions 804, early fall 808, and winter 812, because the landmarks, such as houses and tree trunks, are not obscured by falling leaves or fresh snow. Lidar images of the sky 850 captures limb patterns above the street for use in limb pattern matching for vehicle localization. Lidar images of the sky 850 would be unusable due to the canopy 852 in normal operating conditions 804, and unusable to poor 854 in the early fall 808 when the majority of leaves remain on the limbs. However, lidar images of the sky 850 may be excellent 856 in winter 812 when limbs are bare.

In another illustrative example, a group of three coordinated combines may be tasked with harvesting a crop, such as combine/harvesters 104, 106, and 108 on field 110 in FIG. 1. In this example, multiple vehicles are working together, potentially operating in close proximity on field 110. The worksite, field 110, may have few fixed visual landmarks, such as telephone poles, for task-relative localization. In this example, communication between combine/harvesters 104, 106, and 108 may be important for vehicle-relative localization. The goals for combine/harvesters 104, 106, and 108 may be the following: not to harm people, property, or self; not to skip any of the crop for harvesting; perform efficiently with minimum overlap between passes; and perform efficiently with optimal coordination between vehicles. In order to meet these goals in view of the work site environment, a combination of sensors, such as global positioning system 502, visible light camera 512, and two dimensional/three dimensional lidar 506 in FIG. 5 may be used to estimate vehicle position relative to other vehicles on the worksite and maintain a safe distance between each vehicle.

A preferred embodiment provides a method and system that facilitates operation of autonomous equipment by providing a mission planner to maintain line-of-sight contact between a plurality of coordinated machines. The mission planner may be used when coordination needs the machines to remain within a specified distance of each other to provide adequate 'positioning' accuracy, or else to provide adequate safeguarding. It may also be needed when communication or sensing signals may be blocked by earth, buildings, vegetation, and other features on a worksite. Providing such line-of-sight contact between a plurality of coordinated machines advantageously allows for the possibility of using a plurality of different mechanisms that allow for recovery from a plurality of different types of errors that may be encountered.

There are three main primary scenarios for the operating environment that must be dealt with.

First, the worksite conditions may be fairly benign such that if one of a plurality of vehicles may have a positioning or safeguarding issue, the problem may be solved by keeping the vehicle in close proximity to the others and then having the others provide the missing information to the sensor deficient vehicle. This is what was described in the related cross-referenced application.

The second scenario can be the situation where it may be known a priori that there are topological or environmental features at the work site which will inhibit communications, positioning, or safeguarding. These features may be a common failure mode to all the vehicles, if they are in proximity to each other, and consequently the tight formation solution of the first scenario described above may be inadequate. The vehicles need to appropriately spread out to maintain functionality of the worksite fleet.

The third scenario may be the situation where an equipment breakdown occurs in the field, an exceptional unforeseen environmental condition occurs, etc. Dynamic planning needs to be done in the field. The current recommended solution may be to take the present worksite situation as an input to the a priori planner for scenario 2 described above and use the output from that method going forward.

Thus, a worksite task, particularly involving area coverage, may be completed efficiently by a plurality of coordinated machines in conditions where line-of-site contact between the machines may not be possible across the whole worksite OR where machines need to be dispersed to address a common mode positioning or safeguarding degradation or failure. Area coverage applications include, but are not limited to, tillage, planting, chemical application, harvesting, construction site preparation, mowing, landscaping, field drainage, field irrigation, cleaning, vacuuming, snow plowing, etc.

Step 1. Divide the worksite into a grid.

Figure 9:
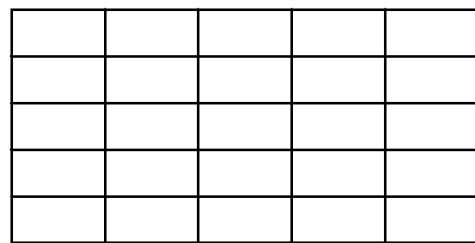
FIG. 9 includes a representative work site divided into a 5×5 grid in accordance with an illustrative embodiment.

The example worksite shown in FIG. 9 can be square and may be divided into a 5×5 grid. Real worksites will vary in size, shape, and grid element size. This method may also be used with vector representations of the worksite and subareas within the worksite, but grids are used here for simplicity. Partitioning with vectors or quadtrees may result in elements of varying sizes.

In other illustrative examples, the perimeter may be shapes other than rectangles such as, without limitation, a polygon with other than four sides, curves, or any other shape. The worksite may contain a number of keep-out areas where the machines should not travel or should not perform an operation. Finally, the grid elements may be any shape including, but not limited to, polygons, enclosed curves, etc. Thus, a worksite may be any shape and contain a number of grid elements with varying shapes and sizes.

Step 2. For each element of the grid, calculate the number of grid elements with which it includes acceptable line-of-site communications. Maintain a list of Grid elements with which each grid element can communicate.

A large portion of worksites have zero or a small number of communications barriers and these are fairly static. It may also be the case that inter-vehicle communications may be essential for the envisioned level of coordination. Thus, this partitioning may be done first to identify where machines will be able to communicate with each other.

Figure 10:
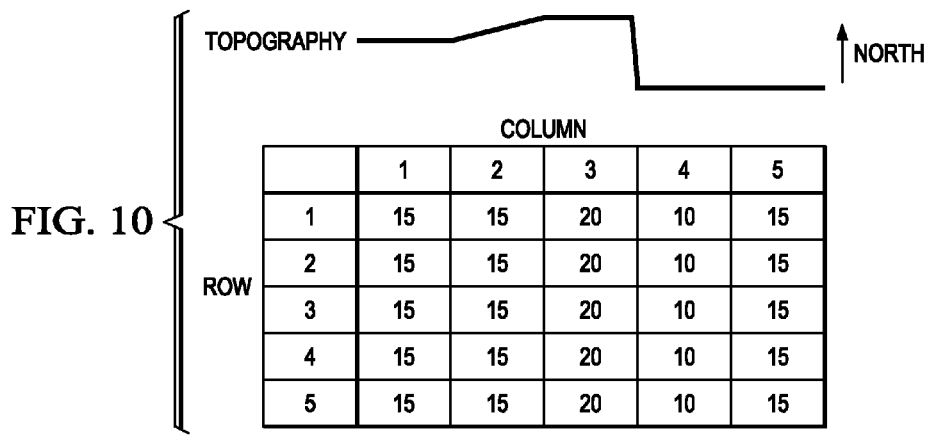
FIG. 10 includes a representative work site divided into a 5×5 grid that includes line-of-site (LoS) communication grid counts in accordance with an illustrative embodiment.

FIG. 10 shows an example topological cross section for the worksite of FIG. 9. Topography varies only from east to west for simplicity of discussion.

Column 1 may be flat;
Column 2 slopes up gradually from west to east;
Column 3 may be a flat plateau;
Column 4 can be flat, but may be separated from column 3 by a steep cliff which blocks communication and other line-of-sight communications to all columns to the west/left;
Column 5 can be flat and far enough from the cliff that there may be LoS contact with column 3, but not columns 1 and 2 which lie below the signal-blocking plateau.

Every grid element should have complete LoS communications within itself, otherwise the grids are too large and should be reduced in size. Thus, the grid counts—which may be a count of how many grids a given grid includes LoS communication with—have a minimum value of 1 (for the situation where a grid only includes LoS communication with itself, but not with other grids). In this example with a 5×5 grid for a total of 25 grids, the maximum grid count would be 25, where every grid element can communicate with every other grid element.

A grid element may communicate with another grid element if (a) there are no barriers, such as the cliff blocking communication, and (b) the grid elements are not out of range of the communication system being used on the worksite. Range may not be considered in this example. Another factor which could be included in reachability—the height of the antenna above ground on each of the tightly coordinated vehicles.

Because of the gentle slope in column 2, all elements in columns 1 and 2 may communicate with each other and all the elements of column 3. Thus, columns 1 and 2 have grid counts of 15.

Elements in column 3 may communicate with all elements of columns 1 and 2 due to the gentle slope of column 2. Elements of column 3 may not communicate with any element in column 4 due to the steep cliff. Elements in column 3 may communicate with grid elements in column 5 because they are sufficiently far away from the steep cliff which blocks signals. Thus column 3 grid elements have a grid count of 20.

Elements in column 4 are blocked from communicating with elements in columns 1, 2, and 3 by the steep cliff. However, elements in column 4 may communicate with elements in the flat area of columns 4 and 5. Thus, the elements in column 4 have a grid count of 10.

Elements in column 5 are blocked by the steep cliff from communicating with elements in columns 1 and 2. However, elements in column 5 may communicate with elements in the adjacent flat area of column 4 and elements on the plateau of column 3. Thus, elements in column 5 have a grid count of 15.

LoS may be defined at the ground or floor of the grid element, but LoS may be preferably defined at some height above this base level. The base level may be described with a single number or as a numeric range, such as the highest and lowest elevation within the grid element. The height may be, for example, without limitation, a vehicle antenna height, a laser reflector height, a vehicle feature height, a camera height, etc. The LoS height may be reduced by some amount to improve system performance or reliability. Examples of these corrections include, without limitation an amounted related to radio signal Fresnel zone, topographic map error, and camera field of view.

LoS communications includes, without limitation, transmission of digital or analog data using radio frequency communications, optical ranging, lidar, radar ranging, infrared data communications, and laser data communications.

Step 3. Combine grid elements into LoS communications zones which may overlap each other.

An LoS communications zone includes a set of worksite grid elements such that any element within the zone includes line-of-sight communications with any other element in the zone. Algorithms to perform this step are well known in computer science, for example and without limitation, simulated annealing algorithms, graph coloring algorithms, and set construction algorithms. The minimum set size may be 1. The maximum set size may be the number of grid elements in the worksite. Zones may overlap.

Figure 11A:
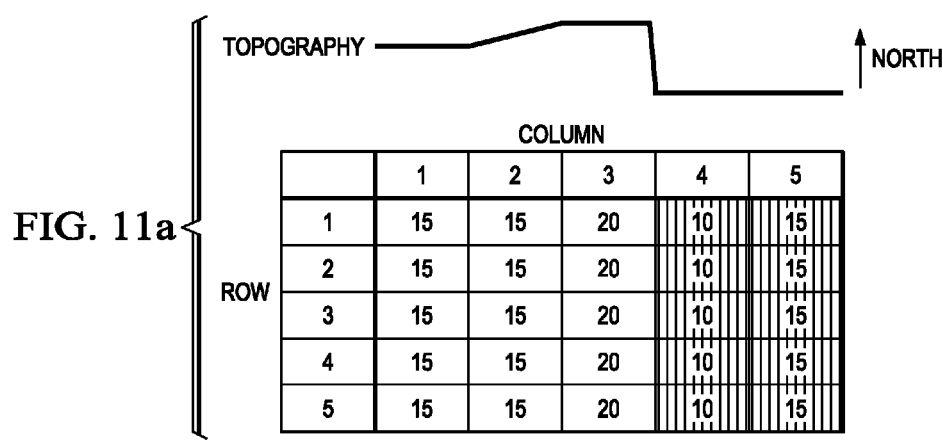
FIGS. 11a-11c include representative LoS communication zones for a representative work site in accordance with an illustrative embodiment.
Figure 11B:
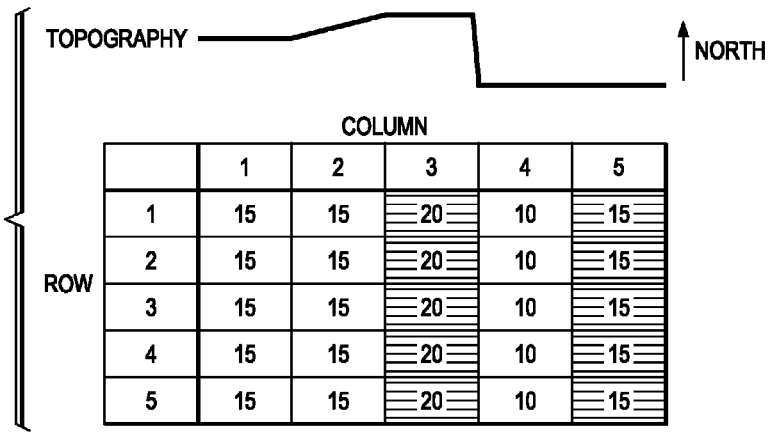
Figure 11C:
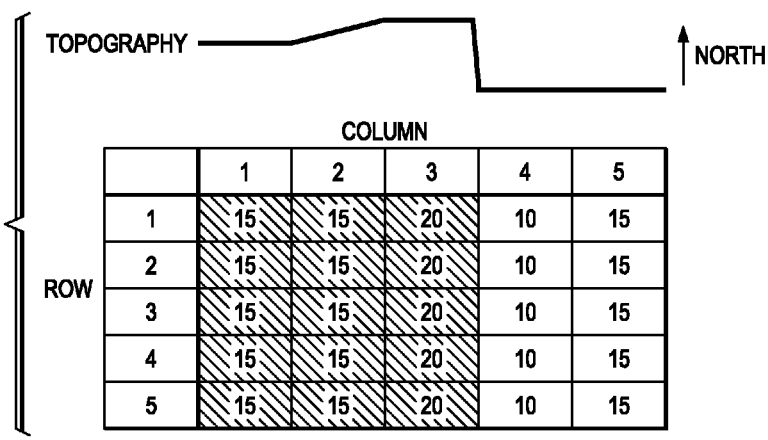

Performing the above grouping on the present example, there are three LoS Zones as shown in FIGS. 11a, 11b, and 11c. Note that the elements making up the LoS zone may not be contiguous as seen in FIG. 11b.

Step 4. Generate potential sequence(s) of LoS Communications Zones to complete the work (e.g. area coverage) task.

In this step, a variety of algorithms could be used, borrowing from set theory, graph theory, state machines, Markov models, etc. The following includes an example of approach taken to generate a single potential sequence.

Step 4a: Start with the zone having the most restrictive LoS communication constraint as represented by the LoS element counts. In this case, it may be the A zone in FIG. 11a because of the presence of the lowest element count: 10.

Step 4b: Add zones to the sequence, giving preference to zones which have the lowest grid count (that indicates a given grid element's LoS communication capability with other grid elements) and then have greatest proximity to the latest zone in the sequence.

Step 4c. Repeat step 4b until all zones are in the sequence. The resulting zone sequence from applying the algorithm above includes:
1. Zone A, as shown in FIG. 11a, because of low element count;
2. Zone B, as shown in FIG. 11b, because of adjacency/overlap with Zone A;
3. Zone C, as shown in FIG. 11c, because of adjacency/overlap with Zone B.

In the general case, it may be desirable to have multiple sequence possibilities to facilitate optimization in later steps. Once having performed the rest of this method for all the candidate sequences, those which meet communications, positioning, and safeguarding constraints on performance requirements, can be subjected to an optimization step 8 (described further below) which selects a candidate sequence against some optimization criteria including, but not limited to total job cost, estimated job time, fuel use, etc.

Step 5. For each LoS Communications Zone, identify if (a) there exists a positioning quality issue (per the first scenario described above), or (b) there exists a vehicle safeguarding issue due to topography, buildings, vegetation, vehicle component failure, environmental condition etc. If there are no Issues in any of the LoS Communications Zones, go to Step 7.

Step 6. For each LoS Communications Zone with a positioning or safeguarding issue, generate a mission subplan for that zone which addresses the issue(s) and includes elements such as a path plan and a task plan (e.g. seed or fertilizer application rate, etc.).

Step 3 in this method, which forms the LoS Communications Zones, ensures that LoS communications are possible between any two machines within the zone—which may be critical for coordination and especially critical for feeding a machine position and safeguarding information which may not be able to generate itself.

The algorithms to generate the mission subplan are numerous and narrow in order to address subtleties of the worksite, the sensors on the machines, the root cause of the issue being addressed, etc.

One example shown below for a specific problem in the current example: GPS may be degraded in column 4 by satellite signal blockage of the cliff between columns 3 and 4. The machines are assumed to be equipped with optical ranging means so that two machines can visually triangulate the position of a third. To do so with a given accuracy from dilution of precision (DoP) and d*tan(theta) geometry, the three machines need to be within a certain distance of each other and maintain a minimum or larger angle of separation.

FIG. 12 shows the northeast corner of the worksite of FIG. 9: rows 1 and 2, and columns 4 and 5. GPS positioning may not be adequately available in the element row 1, column 4 (shaded).

Machines A, B, and C start at the locations indicated by the thick arrows in each worksite grid element. The back and forth ("boustrophedon") area coverage path of each vehicle may be shown for each vehicle by the arrows and dashes within each of the respective grid elements. Assuming the three machines move at relatively constant (coordinated) speed, the relative position of the three machines A, B and C will remain fairly fixed in a constellation which assures adequate accuracy in triangulating the position of machine A given:

Known global locations for machines B and C;
Ranging information between machines B and A and machines C and A;
Angle of separation of machines B and C as observed from machine A.

Addressing positioning issues may be generally easier than addressing safeguarding issues. This may be because (a) the only objects to consider are the machines involved in the triangulation calculation, and (b) the only locally measured parameters needed are ranges and angles between machines.

Safeguarding needs to identify objects much smaller than machines, and the range of sensors to obtain that level of resolution (versus the whole machine) may be reduced. Thus, tight formation driving may be the preferred means of addressing a safeguarding deficiency on one of the vehicles. It essentially travels within the field of regard of the neighboring machines. However, as demonstrated in the GPS example above, it may not always be possible to have vehicles travel in tight formation.

If the worksite may be static—that is, for a specified period of time it may be unlikely the obstacle map will change due to windblown objects, small vehicles, wandering people, small objects falling off of vehicles, etc.—the obstacles mapped by, say, machine B may be adequate for machine A until machine B may be again in range of cell row 1, column 4 to provide an updated obstacle map.

Step 7. For each LoS Communications Zone without a positioning or safeguarding issue, generate a Mission subplan which includes elements Such as a path plan and a task plan (e.g. seed or fertilizer application rate, etc.).

If there are no positioning or safeguarding issues which need to be addressed with coordinated sensing with vehicles at a distance or some other relative position from each other, the path and task planning may be flexible. A typical approach for an area coverage task would be tight formation driving in a boustrouphadon (back and forth) fashion across the zone.

Step 8. For each of the candidate worksite job sequence(s), order it with respect to the others based on some optimization criteria in order to select the optimum mission plan for execution.

In the general case, it may be desirable to have multiple sequence possibilities to facilitate optimization in later steps. After having performed the rest of this method for all the candidate sequences, those which meet communications, positioning, and safeguarding constraints on performance requirements, can be subjected to an step 8 which selects a candidate against some optimization criteria including, but not limited to total job cost, estimated job time, fuel use, etc.

Step 9. Transfer mission plan.

The optimized mission plan may then be transferred to the coordinated vehicles which carry out the coordinated task at the worksite, thus having a physical effect on the environment. Transfer may be wireless, wired, or via a physical media such as memory card, memory stick, etc.

Figure 13:
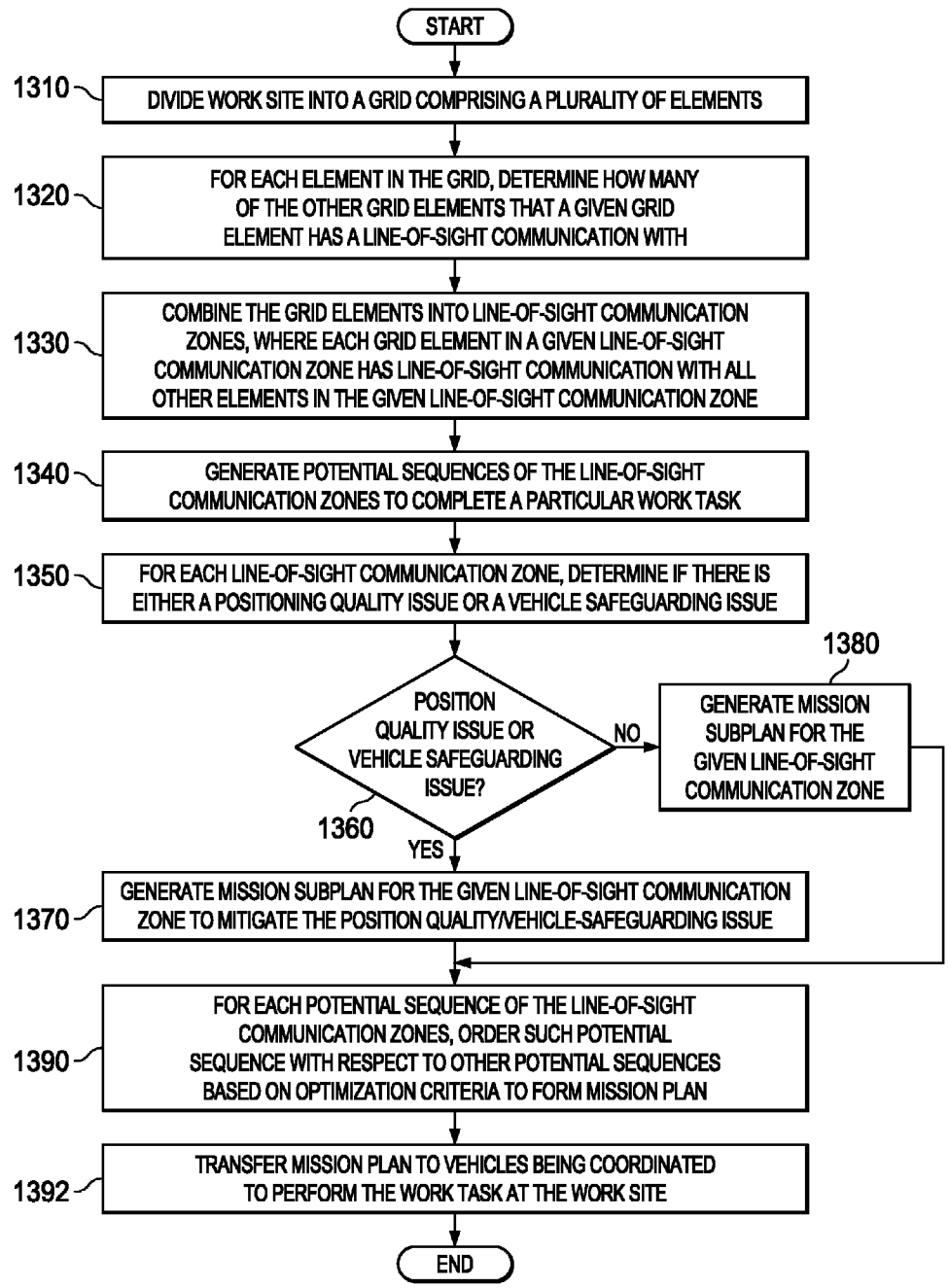
FIG. 13 includes a block diagram of a method for generating a mission plan to coordinate activities of a plurality of vehicles in accordance with an illustrative embodiment.

The above described method for generating and disseminating an optimized mission plan may also be depicted at 1300 in FIG. 13. At step 1310, the work site for which a particular work task may be performed by a plurality of coordinated vehicles may be divided in a grid comprising a plurality of grid elements. For each grid element of such grid, a determination may be made at step 1320 as to how many of the other grid elements that a given grid element may be able to communicate with using line-of-sight communication. These grid elements are combined at step 1330 into a plurality of line-of-sight (LoS) communication zones, where each grid element in a given LoS communication zone includes LoS communication with all other elements in the given LoS communication zone. Potential sequences of the LoS communication zones needed to complete a particular task in the work site are generated at step 1340. For each generated LoS communication zone, a determination may be made at step 1350 as to whether there may be either (i) a positioning quality issue, or (ii) a vehicle safeguarding issue. As previously described, a positioning quality issue pertains to an issue with a sensor, whereas a vehicle safeguarding issue pertains to an issue with regards to topology, buildings, vegetation, vehicle component failure, environmental condition, etc.). For the given LoS communication zone, if there may be such a position quality issue or vehicle safeguarding issue, as determined at step 1360, a mission subplan may be generated at step 1370 for such given LoS communication zone that mitigates the positioning quality/vehicle safeguarding issue. For example, if a GPS signal may be degraded due to topology signal blocking, optical ranging may be used so that two vehicles can visually triangulate the position of a third vehicle, and the travel paths of the vehicles may be chosen for this mission subplan that ensures the vehicles maintain LoS communication with respect to one another. For a given LoS communication zone, if there may be no such positioning quality/vehicle safeguarding issue as determined at step 1360, a standard mission subplan may be generated at step 1380 that includes a path plan and task plan (a task such as a seeding or fertilizer application within the work site). For each potential sequence of the LoS communication zones, as generated per step 1340, it may be ordered with respect to the remaining potential sequences based on particular optimization criteria such as total job cost, total job time and fuel cost at step 1390. A mission plan may then be transferred to vehicles being coordinated to perform the work task at the work site at step 1392.

Thus, there may be provided a method and system that facilitates operation of autonomous equipment by providing a mission planner to maintain line-of-sight contact between a plurality of coordinated machines. The mission planner may be used when coordination needs machines to remain within a specified distance of each other to provide adequate 'positioning' accuracy, or else to provide adequate safeguarding. It may also be needed when communication or sensing signals may be blocked by earth, buildings, vegetation, and other features on a worksite. Providing such line-of-sight contact between a plurality of coordinated machines advantageously allows for the possibility of using a plurality of different mechanisms (e.g., GPS, imaging, lidar) that allow for recovery from a plurality of different types of errors that may be encountered.

The description of the different illustrative embodiments may be presented for purposes of illustration and description, and not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles, the practical application, and to enable others of ordinary skill in the art to understand the various embodiments with various modifications as are suited to the particular use contemplated.

What is claimed is:
1. A method for maintaining line-of-sight (LoS) communication between a plurality of machines, comprising steps of:
creating a mission plan for a work site that includes a path plan for each of the plurality of machines that maintains the line-of-sight communication between the plurality of machines by taking into account a topography for the work site; and loading the path plan for each respective one of the plurality of machines into the each respective one of the plurality of machines, wherein the path plan specifies a machine travel path for the each respective one of the plurality of machines, wherein the step of creating the mission plan comprises:

subdividing the work site into a grid comprising a plurality of grid elements;

forming a plurality of grid counts by determining a grid count, for each given grid element of the plurality of grid elements, that indicates how many other ones of the plurality of grid elements the given grid element can communication with via line-of-sight;

combining the plurality of grid elements into a plurality of LoS communication zones, where each grid element in a given one LoS communication zone of the plurality of LoS communication zones has LoS communication with all other grid elements in the given one LoS communication zone; and generate a sequence of particular ones of the plurality of LoS communication zones to complete a work task.

2. The method of claim 1, wherein the generating step comprises adding a LoS zone to the sequence by giving preference to zones which have a lowest grid count, and then to zones that have a greatest proximity to a most recent zone added to the sequence.

3. The method of claim 1, wherein multiple sequences to complete the work task are generated.

4. The method of claim 3, wherein a given sequence of the multiple sequences is selected for the path plan, wherein the given sequence is selected from the multiple sequences based on at least one of total job cost, estimated job completion time, and fuel usage.

5. The method of claim 1 further comprising:
determining, for each of the plurality of LoS communication zones, if a given one of the plurality of LoS communication zones has at least one of a positioning quality issue and a vehicle safeguarding issue;
if so, generating a mission subplan for the given one of the plurality of LoS communication zones to mitigate the at least one positioning quality issue and vehicle safeguarding issue; and
if not, generating a standard mission subplan for the given one of the plurality of LoS communication zones.

6. The method of claim 1, wherein each grid element has complete line-of-site communication within itself.

7. The method of claim 1, wherein a given grid element has line-of-site communication with another given grid element if there are no barriers blocking communication between the given grid element and the another given grid element.

8. The method of claim 1 further comprising operating each of the plurality of machines according to its respective path plan.

9. The method of claim 8, wherein sensor data from one of the plurality of machines is used to control at least in part another one of the plurality of machines.

10. A computer program product having program code stored on a non-transitory computer readable storage medium, where the program code is operable by a data processing system for optimizing behavior of an autonomous mobile robotic device by performing the steps of claim 2.

11. The method of claim 1, wherein the another one of the plurality of machines performs localization using the sensor data from the one of the plurality of machines.

12. The method of claim 1, wherein the one of the plurality of machines determines a position estimate of the another one of the plurality of machines responsive to receiving a request from the another one of the plurality of machines.

13. The method of claim 1, wherein the one of the plurality of machines determines a position estimate of itself and transmits the position estimate of itself and the position estimate of the another one of the plurality of machines to the another one of the plurality of machines to facilitate the localization performed by the another one of the plurality of machines.

14. The method of claim 1, further comprising:
responsive to determining a problem with at least a portion of its own sensor system, the another one of the plurality of machines requests the sensor data from the one of the plurality of machines.

15. The method of claim 1, further comprising:
responsive to determining a diminished detect range with respect to its own sensor system, the another one of the plurality of machines requesting the sensor data from the one of the plurality of machines.

16. The method of claim 1, wherein the machine travel path for the each respective one of the plurality of machines is configured so that the each respective one of the plurality of machines remain within a specified distance of one another.

17. The method of claim 1, wherein the machine travel path for the each respective one of the plurality of machines is configured so that the each respective one of the plurality of machines remain spread out from one another to maintain functionality of a mission for the plurality of machines.

18. The method of claim 17, wherein the mission in an area coverage task.

* * * * *